No. 763,557. PATENTED JUNE 28, 1904.
F. HACHMANN.
FISH LINE FLOAT.
APPLICATION FILED AUG. 21, 1903.
NO MODEL.
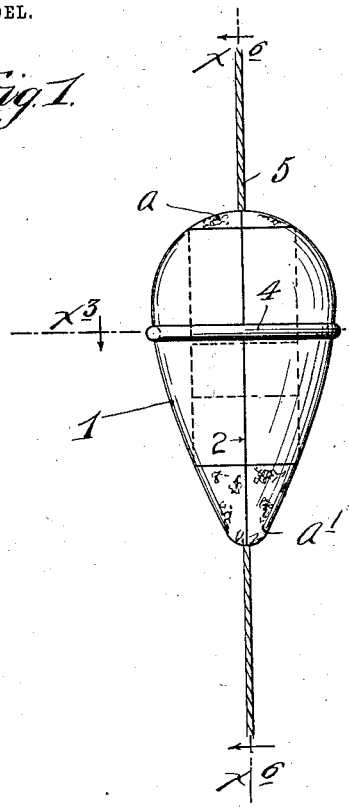
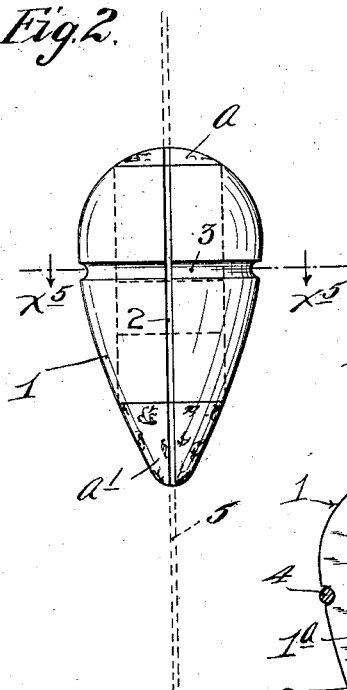
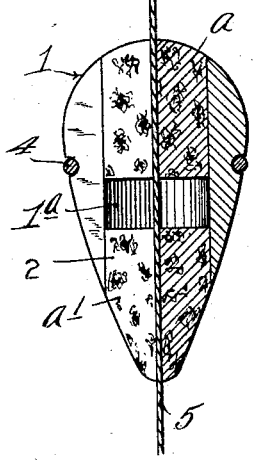
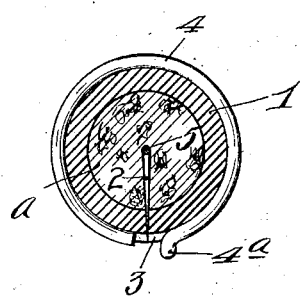
Witnesses:
H. D. Kilgore
A. H. Opsahl
Inventor:
Frederick Hachmann.
By his Attorneys,
Williamson & Merchant No. 763,557. Patented June 28, 1904.

UNITED STATES PATENT OFFICE.

FREDERICK HACHMANN, OF ST. PAUL, MINNESOTA, ASSIGNOR OF SEVEN-EIGHTHS TO GEORGE G. WHEAT AND ELMER B. PERSONS, OF MINNEAPOLIS, MINNESOTA, AND FRANK L. GAZZOLO AND JOHN R. PATTY, OF ST. PAUL, MINNESOTA.

FISH-LINE FLOAT.

SPECIFICATION forming part of Letters Patent No. 763,557, dated June 28, 1904.

Application filed August 21, 1903. Serial No. 170,243. (No model.)

*To all whom it may concern:*

Be it known that I, FREDERICK HACHMANN, a citizen of the United States, residing at St. Paul, in the county of Ramsey and State of Minnesota, have invented certain new and useful Improvements in Fish-Line Floats; and I do hereby declare the following to be a full, clear, and exact description of the invention, such as will enable others skilled in the art to which it appertains to make and use the same.

My present invention relates to fish-line floats, and has for its object to improve the same in the several particulars hereinafter noted.

The invention is illustrated in the accompanying drawings, wherein like characters indicate like parts throughout the several views.

Figure 1 is an elevation showing a portion of a fish-line and illustrating one of my improved floats attached thereto. Fig. 2 is a similar view to Fig. 1, but with the clamping-ring of the float removed and with the fish-line shown by dotted lines. Fig. 3 is a section on the line $x^3 x^3$ of Fig. 1. Fig. 4 is a section on the same line as Fig. 3, but showing the clamping-ring moved into different positions. Fig. 5 is a section on the line $x^5 x^5$ of Fig. 2, and Fig. 6 is a section on the line $x^6 x^6$ of Fig. 1.

The numeral 1 indicates the body of the float, preferably made of wood, being cored out on its axial line, as shown at $1^a$, and both ends of said core being plugged with cork plugs $a$ and $a'$, said plugs extending beyond the body 1, so as to form, together with the body, an approximately egg-shaped float. This float is half-split or, in other words, is slitted longitudinally from its outer surface to its axis, as indicated at 2. Furthermore, it is provided with an endless channel or groove 3, extending, preferably, in a plane cutting its largest transverse diameter. Seated in the groove 3 is a split clamping-ring 4, the ends of which are spaced apart for a purpose which will presently appear. The said split clamping-ring is preferably formed of round spring-steel wire and preferably has one end bent outwardly slightly, as shown at $4^a$, to afford a finger-piece by means of which the ring may be adjusted circumferentially in the groove 3, so as to bring the gap between its ends into alinement with the slit 2, as shown in Fig. 4, or out of alinement therewith, as shown in Fig. 3.

The numeral 5 indicates the fish-line.

When the clamping-ring 4 is adjusted, as shown in Fig. 4, the line may be forced laterally through the slit 2 to the axis of the body 1 or, in other words, into operative position. Also in the position of the ring shown in Fig. 4 the line may be removed from the float by forcing it laterally outward through the slit 2 and through the gap between the ends of the ring 4. When, however, the line is applied in working position with respect to the float, as shown in Figs. 1, 3, and 4, and the ring 4 is turned approximately as shown in Figs. 1 and 3, the line cannot of course be removed laterally from the float, but can, nevertheless, be drawn in either direction axially through the same, so as to effect any desired adjustment of the float on the line. This latter feature is of course very important, since it is frequently necessary in fishing to readjust the float on the line to vary the depth to which the hook will be dropped into the water. The spring clamping-ring, of course, tightly presses together the slit portion of the float 1, so that the line will be held with considerable force at the axis thereof.

The device described, while of extremely small cost, is efficient for the purposes had in view and permits the float to be quickly applied to a line or removed therefrom and when applied to be very easily and quickly adjusted by sliding the same on the line.

It will of course be understood that the device is capable of some modification within the scope of the invention as herein set forth and claimed. For instance, the entire float may be made entirely either of cork or wood or the plugs above described may be made of a continuous piece of cork instead of separate pieces. I have also found that the construction I have shown and described makes a cheaper and a stronger float than one of all cork and at the same time one of very light weight. I have found, too, that by using discarded cork stoppers from bottles for plugs the expense may be greatly reduced.

What I claim, and desire to secure by Letters Patent of the United States, is as follows:

A fish-line float comprising a wooden body having an axial core of cork, said float being split from one side to its axis, and a split clamping-ring surrounding the same and transversely intersecting said slit, substantially as and for the purposes set forth.

In testimony whereof I affix my signature in presence of two witnesses.

FREDERICK HACHMANN.

Witnesses:
ROBERT C. MABEY,
F. D. MERCHANT.